United States Patent [19]

Bayer

[11] Patent Number: 5,665,906
[45] Date of Patent: Sep. 9, 1997

[54] DEVICE FOR GENERATING A SYNTHETIC SIGNAL FOR TESTING KNOCK CONTROL FUNCTIONS

[75] Inventor: Michael Bayer, Munich, Germany

[73] Assignee: Bayerische Motoren Werke AG, Munich, Germany

[21] Appl. No.: 657,772

[22] Filed: May 31, 1996

[30] Foreign Application Priority Data

May 31, 1995 [DE] Germany .................. 195 20 033.0

[51] Int. Cl.$^6$ .................................................. G01M 15/00
[52] U.S. Cl. .................. 73/118.1; 73/116; 73/117.3;
73/35.03; 73/35.06; 123/419; 123/436;
701/110; 701/111
[58] Field of Search ........................... 73/115, 116, 117.2,
73/117.3, 118.1, 35.01, 865.9, 35.03, 35.06;
364/431.07, 431.08; 123/419, 436

[56] References Cited

U.S. PATENT DOCUMENTS

| | | | |
|---|---|---|---|
| 4,365,333 | 12/1982 | Mulvey | 371/27 |
| 4,382,235 | 5/1983 | Shifflet | 331/127 |
| 4,808,865 | 2/1989 | King | 73/116 |
| 4,945,760 | 8/1990 | Hornung | 73/118.1 |
| 5,014,549 | 5/1991 | Morley et al. | 73/118.1 |
| 5,124,919 | 6/1992 | Kastelle | 73/118.1 |
| 5,251,161 | 10/1993 | Gioutsos et al. | 364/578 |
| 5,522,250 | 6/1996 | Gee et al. | 73/118.1 |
| 5,535,620 | 7/1996 | Nichols | 73/118.1 |

FOREIGN PATENT DOCUMENTS

| | | |
|---|---|---|
| 0 367 329 | 5/1990 | European Pat. Off. . |
| 29 42 250 | 5/1981 | Germany . |
| 40 34 411 | 5/1991 | Germany . |
| 43 32 711 | 3/1995 | Germany . |
| 2 009 406 | 6/1979 | United Kingdom . |
| WO94/08135 | 4/1994 | WIPO . |
| WO95/08760 | 3/1995 | WIPO . |

*Primary Examiner*—George M. Dombroske
*Attorney, Agent, or Firm*—Evenson, McKeown, Edwards & Lenahan, P.L.L.C.

[57] ABSTRACT

A device for generating a synthetic signal for testing knock control functions in engine control devices of motor vehicles has a basic noise signal generating unit, a knock signal generating unit, and an actuating device. The output signals of the basic noise and knock signal generating units can be superimposed to form a total signal. The actuating device changes the amplitude and/or frequency or the amplitude and/or frequency curve of the basic noise signal, knock signal, and/or total signal.

13 Claims, 2 Drawing Sheets

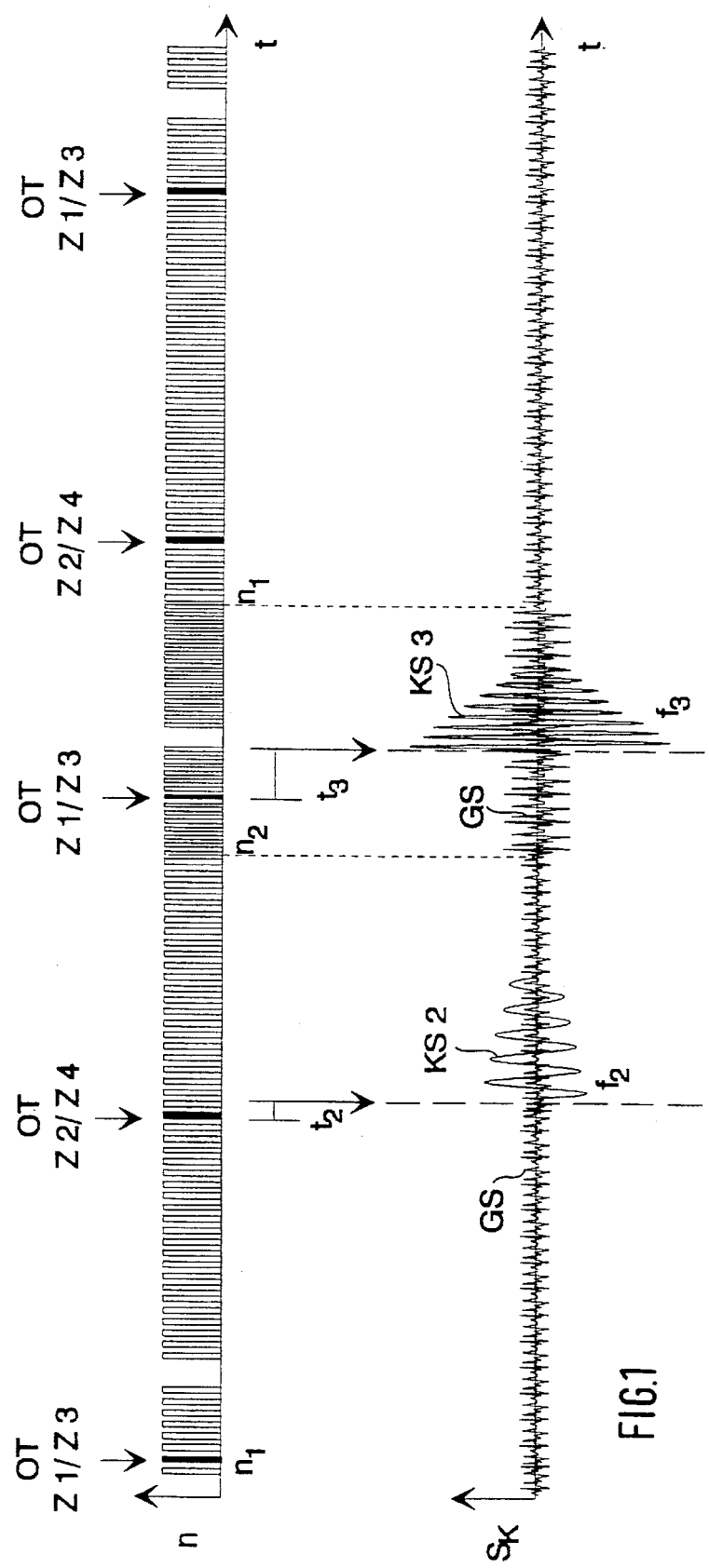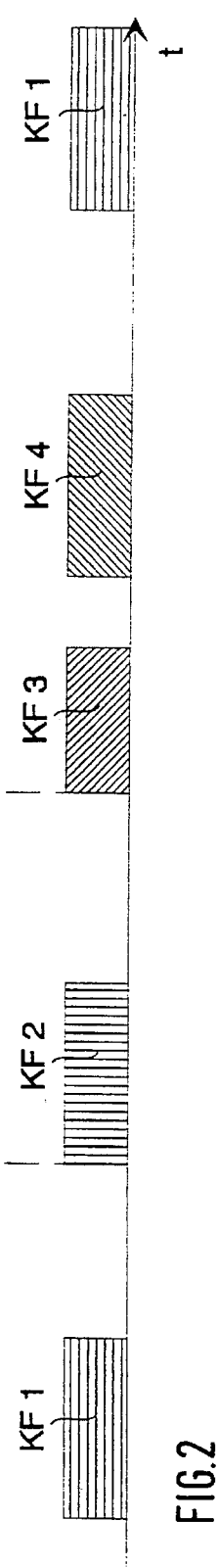
FIG.1
FIG.2

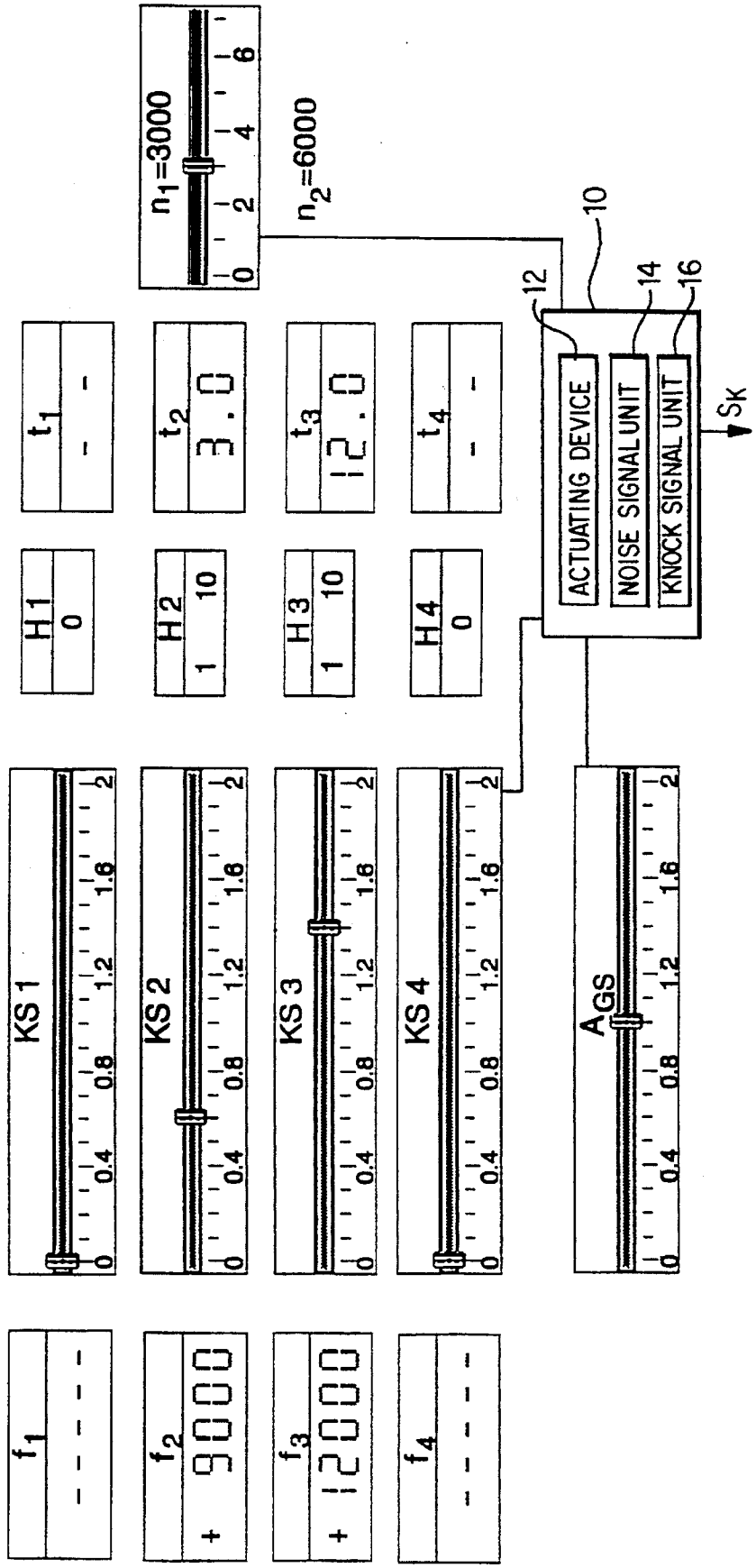

DEVICE FOR GENERATING A SYNTHETIC SIGNAL FOR TESTING KNOCK CONTROL FUNCTIONS

BACKGROUND AND SUMMARY OF THE INVENTION

The invention relates to a device for generating a synthetic signal for testing knock control functions and, more particularly, to a device for generating a synthetic signal for testing knock control functions in engine control devices of motor vehicles.

Electronic control devices are conventionally employed in motor vehicles to control and regulate various engine functions. For example, knock control is performed by means of such control devices as one of the engine functions. "Knocking" or "pinging," which is an uncontrolled form of firing produced by dieseling at an ignition point or ignition angle that is too far advanced, can cause damage to the engine if it occurs too frequently and too violently. For this reason, the ignition point and/or ignition angle is normally set so that it has a safety interval with respect to the so-called knock limit. But an ignition angle that is too far retarded is also undesirable since it results in increased fuel consumption and hence in greater exhaust emissions. Thus, the knock limit is usually detected in engine control devices during operation and the ignition angle is adjusted accordingly.

For knock control, a knock sensor is used that picks up the typical noises that occur during knocking, converts them into electrical signals, and passes the signals to the electronic engine control device. The mounting location of the knock sensor is usually selected so that knocking can be reliably picked up from every cylinder under all conditions. Knock detection for every firing in every cylinder is determined by comparing the knock signal or sensor signal picked up by the knock sensor with a reference level that constantly adjusts automatically to operating conditions. When knocking occurs, the ignition point and/or ignition angle is retarded by a predetermined angle on a cylinder-selective basis. This process is repeated at each firing for every cylinder that is recognized to be knocking. When no further knocking occurs, the ignition point and/or the ignition angle is slowly advanced in small steps until it reaches its characteristic map value. Since the knock limit differs from cylinder to cylinder in an engine, and changes considerably within the operating range, each cylinder has an individual ignition point at the knock limit.

For cylinder-selective knock recognition, a knock window is usually established in the control device for each cylinder and is defined for each cylinder as a function of engine rpm and frequency.

To develop and test such a knock control in electronic control devices in the laboratory, the signal normally supplied by the knock sensor must be realistically simulated. The signal that results in the vehicle and is usually picked up by the knock sensor consists of a noise-like basic noise signal for as long as no knocking occurs, said signal, when knocking does occur, having superimposed on it a knocking signal that resembles a sinusoidal signal and is definitely elevated in amplitude with respect to the basic noise signal level.

For simplification, a synthetic signal has been used heretofore for testing knock control functions, especially in the laboratory, instead of the signals usually picked up by the knock sensor. The synthetic signal, as the basic noise signal, uses only one permanently defined square-wave pulse packet with various permanently specified frequencies and permanently specified low amplitudes, and uses as the knock signal only a square-wave pulse with a permanently set frequency and a permanently set high amplitude. Only a very limited static test of the functional ability of knock recognition and knock control is possible with a simplified synthetic signal of this kind, especially for only one operating point.

The goal of the invention is to improve a device for generating a synthetic signal in such fashion that the synthetic signal is as realistic as possible in comparison to the knock sensor signal that usually appears in engines, and all the functions associated with knock control can be tested without limit in the laboratory, in other words without having an actual engine with a knock sensor and ignition angle retardation.

This goal is achieved according to the present invention by a divide for generating a synthetic signal for testing knock control functions in engine control devices of motor vehicles. A basic noise signal generating unit and a knock signal generating unit provide output signals which can be superimposed to form a total signal. An actuating device is provided for changing the amplitude and/or frequency curve of the basic noise signal, the knock signal (KS), and/or the total signal.

According to the invention, the device has firstly a basic noise signal generating device and a knock signal generating device whose output signals can be combined to form a total level, as well as an actuating device to change the amplitude curve and/or the frequency curve for example of the frequency spectrum, the basic noise signal, the knock signal, and/or the total signal.

The basic noise signal is preferably generated in the form of a noise signal with a low average amplitude and the knock signal is preferably generated in the form of a sinusoidal signal with an elevated average amplitude. The variability of the amplitude and/or frequency or of the amplitude and/or frequency curve, especially of the knock signal, is considerable, as are those of the basic noise signal and/or the total signal. Preferably, the amplitude-or amplitude curve can be changed manually and the frequency or frequency curve can be changed automatically as a function of any operating parameters.

Since usually the test of knock control functions also includes a test of the knock sensor in general, i.e. independently of the occurrence of a knock, preferably the amplitude not only of the knock signal but also of the basic noise signal can be changed.

Since the engine control device usually performs acquisition and evaluation of the knock sensor signal only within a defined so-called "knock window" for each cylinder, the knock signal is generated only for the duration of the knock window of each cylinder, for example.

With this device according to the invention, a test of knock control functions is possible that can be adapted to different operating conditions or types of engines. Different control devices for different engines can therefore be tested as well. The control devices for different engines can differ for example in the threshold value definitions relative to the amplitude of the knock sensor signal to recognize knocking or with regard to the design-related knock signal frequencies. In addition, the synthetic signal can be adjusted by the device according to the invention depending on the way in which the knock sensor signal is evaluated in the control device for engines. For example, there are control devices that compare the reference level as a threshold value for knock detection with maximum amplitude values or with average amplitude values. Accordingly, the curve of the knock signal amplitude can be adjusted. In summary, the device according to the invention provides a very flexible system for testing knock control functions independently of the type of engine or the method of evaluating the control devices.

In one advantageous embodiment according to the invention, the change in amplitude and/or frequency or in the amplitude and/or frequency curve can occur as a function of a signal that is proportional to engine rpm or as a function of the engine rpm signal itself.

This improvement according to the invention takes into account the fact that in certain engines in particular, the frequency and/or the frequency spectrum of the knock signal changes as a function of engine rpm. For this purpose, control devices are provided for example that switch between various evaluation frequency bandpasses to evaluate the knock signal as a function of engine rpm. In addition, an engine-rpm-dependent threshold value setting for detection of knocking is usually chosen in control devices, in other words the higher the engine rpm, the higher the amplitude threshold above which knocking is detected. This improvement according to the invention takes into account the operating parameter with the greatest influence on the occurrence and evaluation of a knock signal.

In another advantageous embodiment according to the invention, the knock signal amplitude and/or frequency can be changed in a cylinder-selective manner.

Since different knock signals can occur in each cylinder under the same operating conditions, so that cylinder-selective knock control is performed in control devices, it is also possible to generate the synthetic signal on a cylinder-selective basis to test the knock control functions. Thus, according to the invention, a separate knock signal can be generated for each cylinder with regard to amplitude and/or frequency. Preferably the cylinder-selective knock signal is generated only within the specified knock window of the respective cylinder. However, it is also possible for example to output the cylinder-selective knock signal from the top dead center point of one cylinder to the top dead center point of the next cylinder.

Thus, the synthetic signal can be optimally adjusted to reality and to the cylinder-selective knock control functions provided.

In another advantageous embodiment according to the invention, the knock signal frequency can be preset within a preset number of crankshaft revolutions or operating cycles.

The knock control functions within the control device act in particular to adjust the ignition angle. The more frequently a knock signal occurs, the more the ignition angle is adjusted. In order to test this preset function, the device is so designed according to the invention that the frequency of the knock signal can be preset and changed,; preferably on a cylinder-selective basis. Another result of this improvement according to the invention is that even more comprehensive testing of knock control functions in the control device is possible.

In yet another advantageous embodiment according to the invention, the beginning of the knock signal can be preset as a function of the signal that is proportional to the engine rpm.

Since the knock windows for evaluating the knock signal begin as a function of the signal that is proportional to the engine rpm, in the device according to the invention the knock signal is preferably also generated in the control devices only when the defined knock window begins. Preferably, the knock signal is generated as realistically as possible for this purpose in the form of an amplitude-modulated sinusoidal signal packet whose amplitude is initially maximal and then decreases steadily. The greater the realism with which the knock signal is generated, the more comprehensively the knock control functions can be tested. Some control devices evaluate only the absolute amplitude, for example the maximum amplitude, to evaluate the knock sensor signal, but other control devices generate the average of the amplitudes over the total signal. In the second case in particular, a realistic knock signal is especially desirable.

The device according to the invention permits a synthetic signal to be generated that can be adapted optimally and flexibly to the requirements imposed by individual control devices.

Other objects, advantages and novel features of the present invention will become apparent from the following detailed description of the invention when considered in conjunction with the accompanying drawings.

BRIEF DESCRIPTION OF THE DRAWINGS

FIG. 1 shows schematically a synthetic total signal generated by the device according to the invention over time and relative to a signal that is proportional to the engine rpm;

FIG. 2 shows the knock window of an internal combustion engine control device for each cylinder, using a four-cylinder engine as an example; and FIG. 3 is a control panel linked with the actuating device, noise signal generating unit, and the knock signal generating unit for manually changing the amplitude and automatically changing the frequency of the basic noise signal and the cylinder-selective knock signals.

DETAILED DESCRIPTION OF THE DRAWINGS

In the upper graph in FIG. 1, a signal n proportional to engine rpm is plotted against time t. The rpm signal n is produced by a known, conventionally employed inductive rpm detection device. The pulses shown are produced by the inductively scanned teeth of a disk non-rotatably connected to the crankshaft. The pulses shaded in black each characterize the top dead center point TDC of cylinders Z1 and Z3 or of cylinders Z2 and Z4. The gaps between the rows of pulses each characterize one revolution of the crankshaft. In order to produce this signal shape, the rotating toothed disk has a gap.

The signal curve in the graph at the top of FIG. 1 has three areas indicated by dashed lines extending to the lower graph. In the first area, a low rpm value $n_1$, 3000 rpm for example, applies. At the first dashed line, the rpm n changes to a higher value $n_2$, 6000 rpm for example. In the third area the higher rpm value $n_2$ changes again to the low rpm $n_1$.

The lower graph in FIG. 1 shows synthetic total signal $S_K$ which is composed of a white noise as a background noise signal GS and an amplitude-modulated sinusoidal knock signal KS2 and KS3 superimposed temporarily. Engine control devices usually have a camshaft sensor (not shownhere) and another evaluation algorithm by which the top dead center points TDC of the individual cylinders can be unambiguously detected. In FIG. 2, the signals of FIG. 1 are contrasted with the curve of cylinder-selective knock signal windows KF1 to KF4 assigned to individual cylinders Z1 to Z4. These knock windows KF1 to KF4 are specified according to the algorithms of the respective control devices. In the present case, according to FIG. 2, the beginning and duration of knock windows KF1 to KF4 depend on rpm signal n. In the present example, it is desired to generate a synthetic knock sensor signal that is as accurate as possible.

The total signal $S_K$ shown in FIG. 1 (bottom graph) shows that no knock signal is simulated in first cylinder Z1 or fourth cylinder Z4 to test the knock control functions for cylinders Z1 and Z4. On the other hand, cylinder-selective knock signals KS2 and KS3 are generated for cylinder Z2 at a low rpm value $n_1$ and for cylinder Z3 at a high rpm value $n_2$, respectively. The amplitude and frequency $f_2$ of knock signal KS2 associated with the second cylinder are reduced with respect to frequency $f_3$ and the amplitude of knock signal KS3 assigned to the third cylinder. The dependence of frequency f and the amplitude of knock signal KS on rpm signal n for example can be stored as a characteristic in a memory contained in the device according to the invention. However, the amplitude of basic noise signal GS can also be changed as a function of rpm signal n. It should also be pointed out that knock signals KS, for example KS2 and KS3, can also consist of a frequency spectrum with a pronounced peak at at least one frequency. In this case the frequency of the peak or peaks is preferably adjustable.

In addition, the beginnings $t_2$ and $t_3$ of knock windows KF2 and KF3 are shown as a function of rpm signal n. At low rpm value $n_1$ knock window KF2 begins for cylinder Z2 relative to the top dead center point TDC of cylinder Z2 at the earlier point in time $t_2$ while knock window KF3 for cylinder Z3 begins at the higher rpm value $n_2$ based on the top dead center point TDC of cylinder Z3 at a later point in time $t_3$. At the beginnings of respective knock windows KF2 and KF3, knock signals KS2 and KS3 also begin. In the embodiment according to FIG. 1 (bottom graph), a synthetic total signal $S_K$ consisting of basic noise signal GS and knock signal KS is shown and very closely resembles a real knock sensor signal.

FIG. 3 shows one possible control panel for the actuating device 12 of the device 10 according to the invention. By means of a slide, the amplitudes of cylinder-selective knock signals KS1 to KS4 from the knock signal generating unit 16 can be adjusted manually for cylinders Z1 to Z4 for example. In the example according to FIG. 1, no knock signals KS1 or KS4 are provided for cylinders Z1 and Z4, and therefore FIG. 3 shows the upper and lower slides for the amplitude of knock signal KS1 and KS4 set to zero. Accordingly, frequencies $f_1$ and $f_4$ as well as the respective beginnings $t_1$ and $t_4$ of knock windows KF1 and KF4 display no values. For cylinders Z2 and Z3 on the other hand, a frequency $f_2$ of 9000 HZ and a frequency $f_3$ of 12,000 Hz are indicated. In addition, beginning $t_2$ of knock window KF2, and hence the beginning of knock signal KS2, as well as beginning $t_3$ of knock window KF3 and hence of knock signal KS3, are indicated on the control panel in FIG. 3 by values of 3.0 and 12.0. These values can relate for example to the number of teeth or the crankshaft angle spacing of the top dead center points TDC of cylinder Z2 and cylinder Z3.

A slide regulator is provided for adjusting amplitude $A_{GS}$ of basic noise signal GS from the basic noise signal generating unit 14, as well as a slide regulator for adjusting engine rpm n. In the case shown, the rpm value $n_1$ is 3000, for example.

In addition, in FIG. 3, with $H_1$ to $H_4$, the frequencies H of knock signals KS1 to KS4 can be preset within a preset number of working cycles. For example in the case shown the knock signals KS2 and KS3 can each appear once within ten operating cycles or twenty crankshaft revolutions. Frequencies H1 and H4 have a zero value for cylinders Z1 and Z4, since no knock signal is provided for them in FIG. 1.

Very flexible and adaptable generation of a synthetic signal instead of a knock sensor signal is possible with this device according to the invention.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed is:

1. A device for generating a synthetic signal for testing knock control functions in an engine control device of a motor vehicle, comprising:

a basic noise signal generating unit having a basic noise signal output;

a knock signal generating unit having a knock signal output, said basic noise signal output and knock signal output being superimposed to form a total signal;

an actuating device for changing at least one of an amplitude and frequency curve of at least one of the basic noise signal, the knock signal, and the total signal.

2. The device according to claim 1, wherein at least one of the amplitude and frequency curve are changed as a function of a further signal proportional to engine rpm.

3. The device according to claim 2, wherein at least one of the amplitude curve and a frequency curve of the knock signal is changed on a cylinder-selective basis.

4. The device according to claim 2, wherein a frequency of the knock signal is preset within a preset number of operating cycles or crankshaft revolutions.

5. The device according to claim 1, wherein at least one of the amplitude curve and a frequency curve of the knock signal is changed on a cylinder-selective basis.

6. The device according to claim 5, wherein a frequency of the knock signal is preset within a present number of operating cycles or crankshaft revolutions.

7. The device according to claim 5, wherein beginnings of the knock signals are preset by the knock signal generating unit as a function of the further signal proportional to engine rpm.

8. The device according to claim 1, wherein a frequency of the knock signal is preset within a preset number of operating cycles or crankshaft revolutions.

9. The device according to claim 8, wherein beginnings of the knock signals are preset by the knock signal generating unit as a function of the further signal proportional to engine rpm.

10. The device according to claim 2, wherein beginnings of the knock signals are preset by the knock signal generating unit as a function of the further signal proportional to engine rpm.

11. The device according to claim 1, wherein beginnings of the knock signals are preset by the knock signal generating unit as a function of the further signal proportional to engine rpm.

12. A method for generating a synthetic signal for testing knock control functions in an engine control device of a motor vehicle, the method comprising the steps of:

superimposing a basic noise signal from a basic noise signal generating unit on a knock signal from a knock signal generating unit to form a total signal; and changing at least one of an amplitude and frequency curve of at least one of the basic noise signal, the knock signal, and the total signal via an actuating device to provide the synthetic signal for testing the knock control functions.

13. A device for generating a synthetic signal for testing knock control functions in an engine control device of a motor vehicle, comprising:

a basic noise signal generating unit having a synthetic basic noise signal output;

a knock signal generating unit having a synthetic knock signal output, said synthetic basic noise signal output and synthetic knock signal output being superimposed to form a total synthetic signal;

an actuating device for changing at least one of an amplitude and frequency curve of at least one of the synthetic basic noise signal, the synthetic knock signal, and the synthetic total signal.

* * * * *